(12) United States Patent
Theobald

(10) Patent No.: US 8,279,266 B2
(45) Date of Patent: Oct. 2, 2012

(54) VIDEO SYSTEM USING CAMERA MODULES TO PROVIDE REAL-TIME COMPOSITE VIDEO IMAGE

(76) Inventor: Daniel Theobald, Sommerville, MA (US)

( * ) Notice: Subject to any disclaimer, the term of this patent is extended or adjusted under 35 U.S.C. 154(b) by 499 days.

(21) Appl. No.: 12/626,987

(22) Filed: Nov. 30, 2009

(65) Prior Publication Data

US 2011/0128348 A1    Jun. 2, 2011

(51) Int. Cl.
*H04N 7/00* (2011.01)

(52) U.S. Cl. .................. 348/36; 348/37; 348/38; 348/39
(58) Field of Classification Search .................. 348/36, 348/37, 38, 39, 159, 48, 218
See application file for complete search history.

(56) References Cited

U.S. PATENT DOCUMENTS

| | | |
|---|---|---|
| 7,012,637 B1* | 3/2006 | Blume et al. ................ 348/218.1 |
| 2002/0122113 A1* | 9/2002 | Foote ................................ 348/48 |
| 2003/0117488 A1* | 6/2003 | Pierce et al. ...................... 348/48 |
| 2004/0233274 A1* | 11/2004 | Uyttendaele et al. ............. 348/36 |
| 2006/0221185 A1* | 10/2006 | Miyamaki et al. ............. 348/159 |
| 2010/0194851 A1* | 8/2010 | Pasupaleti et al. .............. 348/36 |
| 2010/0245539 A1* | 9/2010 | Lin ................................. 348/36 |
| 2011/0074916 A1* | 3/2011 | Demirdjian ..................... 348/36 |

* cited by examiner

*Primary Examiner* — Le H Luu
(74) *Attorney, Agent, or Firm* — Albert J. Brunett

(57) ABSTRACT

A method of providing an omnidirectional view about an object by providing at least two camera modules, each module having a plurality of cameras disposed about the periphery of each module with each camera having a predetermined field of view. The modules are directly attached to a respective predetermined position on a surface of the object to provide up to a 360 degree view about the object when the fields of view of each camera are combined from each module. Electrical communication is enabled between the plurality of cameras and at least one position external to the modules to enable viewing about the object from the external position.

19 Claims, 4 Drawing Sheets

VIDEO SYSTEM USING CAMERA MODULES TO PROVIDE REAL-TIME COMPOSITE VIDEO IMAGE

CROSS-REFERENCE TO RELATED APPLICATIONS

This application is related to U.S. patent application Ser. No. 12/626,983 entitled "Miniature Camera Module", and U.S. patent application Ser. No. 12/626,990 entitled "System for Providing Camera Views", both of which are assigned to the same assignee as the assignee herein, filed concurrently herewith and hereby incorporated by reference.

BACKGROUND OF THE INVENTION

The present invention relates generally to camera modules and more particularly to a method of utilizing one or more low-profile, inexpensive, miniature camera modules to provide omnidirectional, panoramic, panospheric and/or hemispherical views about an object or area.

SUMMARY OF THE INVENTION

A method of providing an omnidirectional view about an object by providing at least two camera modules, each module having a plurality of cameras disposed about the periphery of each module with each camera having a predetermined field of view. The modules are directly attached to a respective predetermined position on a surface of the object to provide up to a 360 degree view about the object when the fields of view of each camera are combined from each module. Electrical communication is enabled between the plurality of cameras and at least one position external to the modules to enable viewing about the object from the external position.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Figure 1:
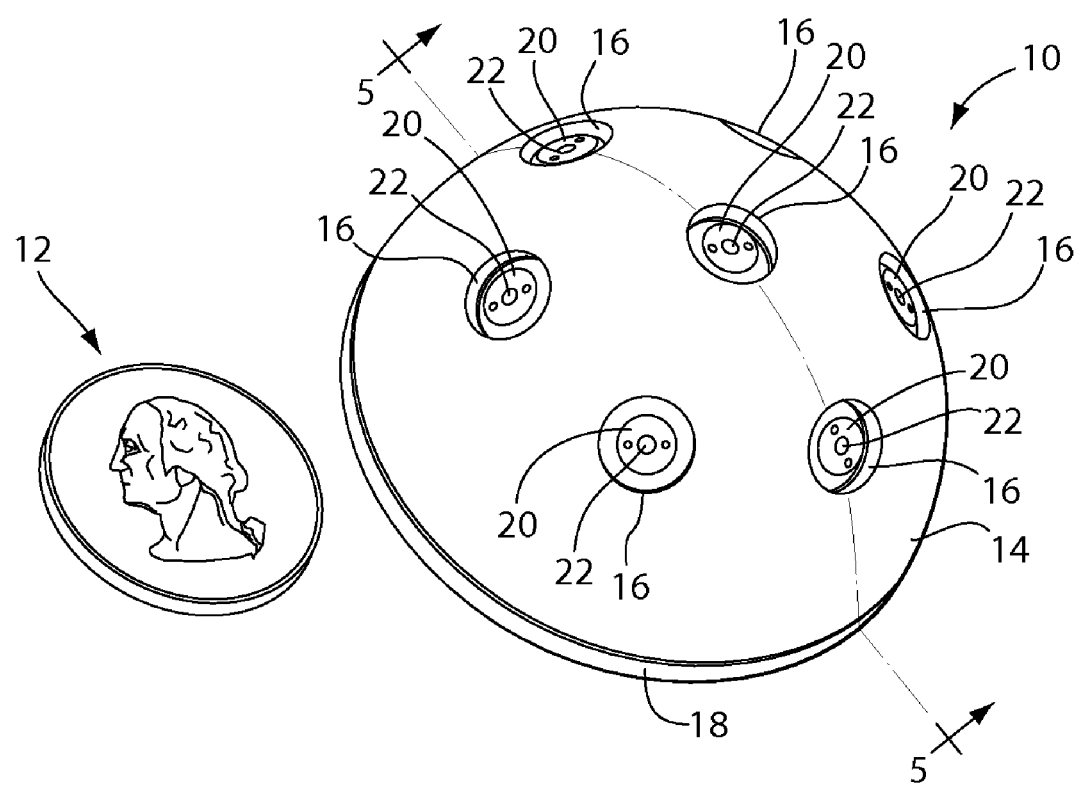
FIG. 1. is a perspective view illustrating one embodiment of a camera module that can be utilized in the present invention.

Referring to FIG. 1, one embodiment of a camera module that may be used in the present invention is generally illustrated by reference numeral 10. The module 10 is illustrated having a generally hemispherical shape, although the size and shape may vary, and may be a miniature module or the like as is illustrated in FIG. 1 with respect to a United States quarter dollar 12.

Although not illustrated, the module 10 may also be in the form of a hemispheroid, either oblate (earth shaped) or prolate (rugby football shaped), or in the form of a plurality of substantially flat or oblique surfaces joined together to form similar types of shapes. Although the module 10 preferably is formed as an oblique object, it is to be understood that the module 10 can have a variety of shapes and sizes without departing from the teachings of the present invention or the appended claims.

The unique shape and size of the module 10 itself enables a number of novel features to be realized by the present invention. These features, among others, include overlapping fields of view for multiple redundancy, a direct camera view for virtually every direction, unobtrusive and inconspicuous operation to resist or eliminate being blocked, detected and/or disabled, and substantially oblique surfaces that, combined with the material of the module 10, can resist disablement from a foreign object or the like as will be described in more detail herein.

Figure 2:
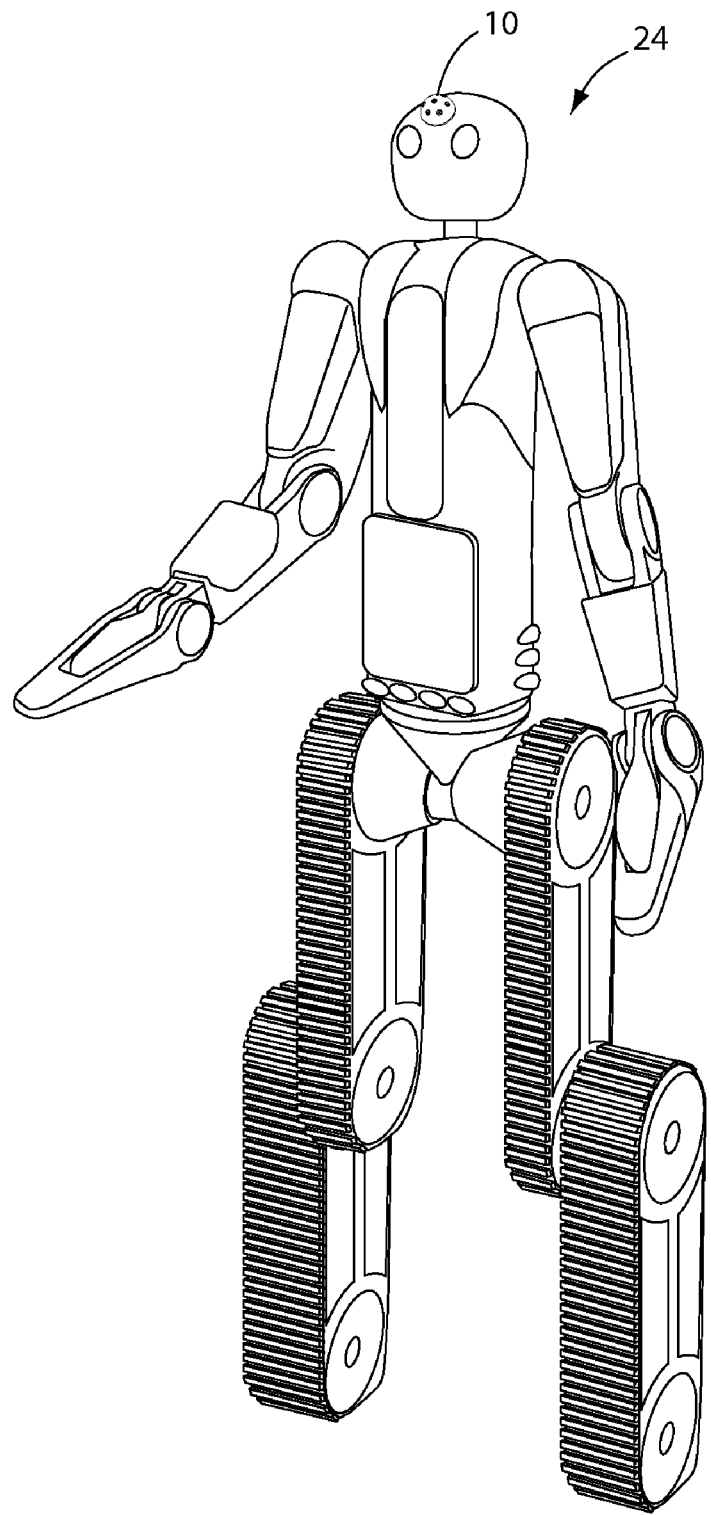
FIG. 2. is a front plan view illustrating the camera module of FIG. 1 attached to an unmanned vehicle, such as a robot.
Figure 3:
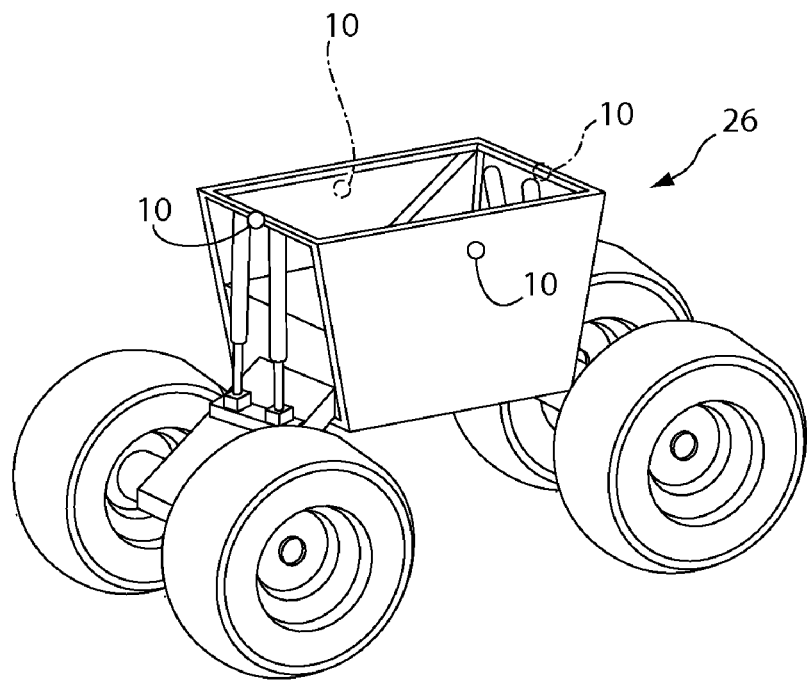
FIG. 3. is a perspective view illustrating one or more of the camera modules of FIG. 1 attached to another type of unmanned vehicle.

The module 10 substantially includes a hemispherical housing 14 having a plurality of apertures 16 therethrough and a substantially flat surface 18 for mounting of the module 10 against a desired article (generally illustrated in FIGS. 2 and 3). The module 10 also includes a plurality of cameras 20, each camera 20 being preferably secured within the confines of the housing 14 so that a lens 22 of each camera 20 provides a desired field of view through a respective aperture 16. Although the module 10 is illustrated with seven cameras 20, the number of cameras 20 and their position with respect to the housing 14, the fields of view and the lenses provided, among other features, may vary.

The housing 14 is designed as a substantially hollow, hemispherical member with a desired thickness and can be formed from any desired material such as plastic or metal (including steel or titanium, for example) or the like as well as a variety of composite materials, including any type of bullet resistant or bullet proof materials such as Kevlar, Lexan or the like so long as the module 10 functions as desired. The housing 14 may also be used in outdoor environments by making it water resistant or waterproof by making it completely sealed against the environment and may be protected by any type of desired armor. It is to be understood, however, that the material of the housing 14, or any other elements or features of the housing 14, may vary without departing from the teachings of the present invention or the appended claims.

If desired, the module 10 may be designed to be completely self-contained with all electronics included inside the housing 14 such as microprocessor(s), data storage, memory, power and external communications such as by any wireless method including Bluetooth, for example. With such a design, all processing of the videos from the various cameras 20 can be accomplished by the module 10 itself, including stitching together multiple or all of the various views of the cameras 20 into one data stream to be stored within, or transmitted to the exterior of, the module 10.

Alternatively, individual views of the cameras 20 can be provided in separate video streams for internal storage or external transmission. With such a design, individual camera views can be selected for viewing and two or more selected views can be stitched for composite viewing.

Although the flat surface 18 of the housing 14 is not illustrated in detail, the flat surface 18 may allow for access to the interior of the housing 14 for mounting or replacement of the cameras 20 therein such as by the use of an openable or removable plate, door or the like or any other type of access. The housing 14 may also include a mounting structure or element (not illustrated) either as part of the flat surface 18 or any other part of the housing 14 including, but not limited to, such mounting methods as screws, brackets, clips, adhesives, and hook-and-loop fasteners, for example.

The apertures 16 of the housing 14 may be through-apertures having the same diameter through the housing 14, may be tapered or take on any other desired size, shape or configuration. Alternatively, the apertures 16 may be replaced with pockets (not illustrated) formed in the housing 14 to accept the cameras 20 therein.

FIG. 2 illustrates one embodiment of the module 10 mounted to an unmanned vehicle such as a robot 24 or the like where the module 10 and cameras 20 can be used in a "visual odometry" type of application where the position, operation and/or orientation of the robot 24 is determined by analyzing images from one or more cameras 20. If desired, multiple modules 10 (not illustrated) may also be used with the robot 24 to provide multiple views from a variety of positions about the robot 24.

As FIG. 3 illustrates, one or more modules 10 may also be mounted to an unmanned transport vehicle 26 intended for transporting items or the like. When the transport vehicle 26 is in the form of a substantially rectangular object as illustrated, the views of the modules 10 enable multiple overlap between modules 10 as described below with regard to FIG. 5.

Figure 4:
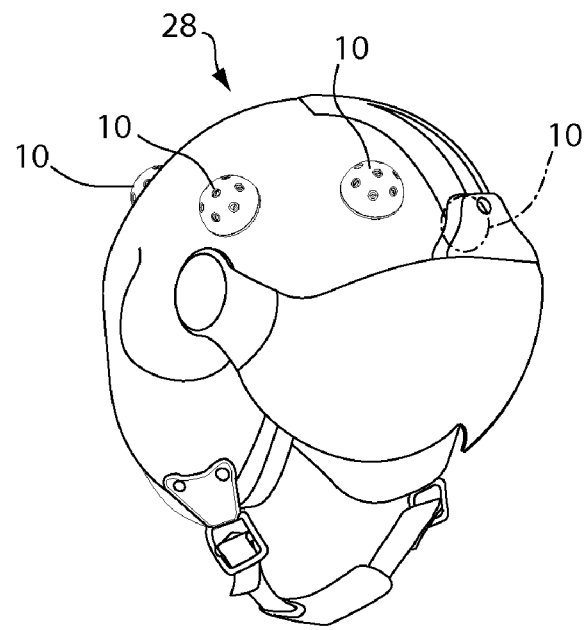
FIG. 4 is a is a perspective view of a head mounted display illustrating multiple camera modules of FIG. 1 secured thereto.

As FIG. 4 illustrates, one or more modules 10 may also be used in conjunction with a head mounted display 28 illustrated in the form of a helmet. It is to be understood, however, that the number and position of modules 10 utilized at any time can vary and the module 10 may be utilized in a variety of applications other than those illustrated.

The use of a module 10 along with multiple cameras 20 and/or multiple modules 10 and the design and shape of the modules 10 themselves represents a dramatic shift away from current remote camera design and application. For example, by providing multiple cameras 20 in a module 10 arranged according to the teachings of the present invention a new level of redundancy in camera views is achieved in the event of a malfunction of one or more of the cameras 20 as will be described further below. Intentional or unintentional disablement of the module 10 can also be more difficult since, due to the overlapping views, each camera 20 in each module 10 must be disabled to prevent a desired view and access to each camera 20 or module 10 may be difficult or too time consuming, for example.

By using multiple modules 10, an additional level of redundancy in camera views can be provided according to the teachings of the present invention by providing multiple sets of cameras 20 in multiple, separate locations selected to provide a heightened level of view redundancy or overlap. This not only can be beneficial in the event of the malfunction or disablement of one or more cameras 20, but in the malfunction or disablement of one or more modules 10.

Figure 5:
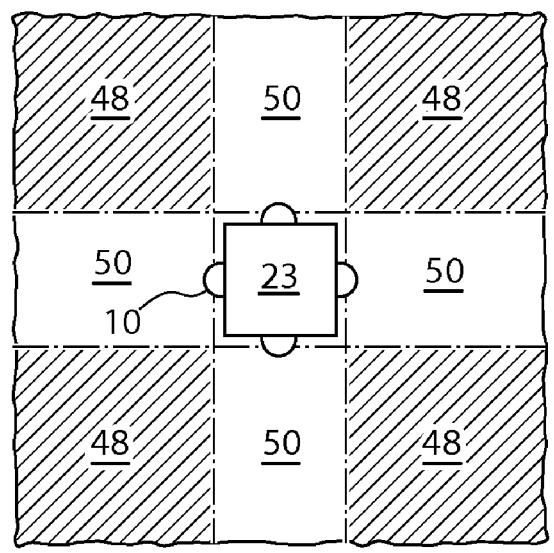
FIG. 5. is a partial top view of the unmanned vehicle of FIG. 3 illustrating one embodiment of the potential field of view of the camera modules.

With reference to FIG. 5, when multiple modules 10 are used on a rectangular object such as the transport vehicle 26 significant portions about the transport vehicle 26 are covered by two modules 10. In this embodiment, coverage by two modules 10 is illustrated by the four single lined sections 48 while coverage by just one module 10 is illustrated by the four unlined sections 50. Of course, for each module 10 seven cameras 20 provide the desired hemispherical view with overlapping fields of view as described above.

With multiple modules 10, intentional or unintentional disablement of one or more modules 10 is more difficult or unlikely. This is particularly important when the modules 10 are used in a security surveillance setting or in conjunction with a robot or other type of unmanned vehicle or craft and even more so in a combat environment. Specifically, when used in a robot or the like, when the camera viewing system is inoperable or disabled the robot is unable to function and if remotely controlled the user is unable to continue to "see" where the robot is and/or needs to be moved.

When used in a hostile environment, such as a surveillance setting or combat zone, an entity who may be interested in disabling the robot can merely take measures to attempt to disable a the camera 20, such as with a projectile, cover, spray paint, implement or other member. With multiple modules 10, while an entity may disable one or more modules 10 the operator may still be able to utilize an existing module 10 not discovered or disabled by an entity to move the robot out of the area.

The design of the module 10 itself also adds to the ability of an operator to maintain control over a robot. The small size of the module 10 provides an extremely low profile making the module 10 unobtrusive and relatively inconspicuous compared to existing modules. If desired, the module 10 can also be camouflaged to blend in with a particular background as illustrated in FIG. 1 to make it even more difficult to spot and potentially disable.

The hemispherical, hemispheroid or other oblique design of the module 10 aids in preventing disabling the module 10 by providing oblique surfaces that may deflect a projectile or implement. This shape also makes breaking off of the module 10 from a surface it is attached to more difficult, particularly if some type of security resistant mounting is employed. When the oblique surfaces of the module 10 are combined with the module 10 being formed from a strong material, such as metal or a bullet resistant or bullet proof material or the like, disabling of the module 10 from a projectile or implement is less likely.

As readily can be understood from FIG. 1, due to the positioning of the cameras 20 about the module 10, when the video of each camera 20 is combined a hemispherical, panoramic or "panospheric" view (hereinafter "view" or "hemispherical view") about the module 10 is provided. The view may extend up to at least 180 degrees in any direction about the periphery of the module 10 but may vary depending on the types of cameras 20 and lenses 22 utilized and the positions about the housing 14.

When multiple modules 10 are used, such as shown with the head mounted display 28 of FIG. 4, for example, the view about the periphery of the display 28 extends well beyond 180 degrees. Although four modules 10 are illustrated, any number of modules 10 can be positioned on the robot 24 or transport vehicle 26 on any side thereof including the top and bottom so that a full 360 degree view is provided about the robot 24 or transport vehicle 26.

The cameras 20 can be any type of camera, video or still, so long as they function as desired, including, but not limited to cameras having a micro lens, miniature and subminiature cameras, fiber optic cameras, CCD cameras, active pixel or CMOS image sensors, or the like including future camera types and styles. Additionally, various software required to "stitch" the various views together is readily available or can be independently developed to fit the particular application.

Preferably, the cameras 20 are not high level resolution cameras, rather, lower resolution cameras 20 are utilized the resolution of which depends on the particular application. In many applications, the quality of the image being captured is not necessarily an important criteria, rather, capturing a desired image with an acceptable level of quality is all that is necessary.

The use of a plurality of lower resolution cameras 20 represents an important shift in the art that enables the desired views in a more economical package enable applications that previously were cost prohibitive. The cost of modules 10 with lower resolution cameras 20 can be low enough to enable modules 10 to be disposable if desired.

A variety of electronics and power supply (not illustrated) may be used along with the cameras 20 to provide the desired view. The electronics and power supply may be contained within the confines of the housing 14 or outside the housing 14 such as within a portion of the robot 24, transport vehicle 26, or head mounted display 28 or in a separate unit utilized in conjunction with the robot 24, transport vehicle 26 or head mounted display 28. The electronics may be hard wired to the cameras 20 and other peripheral devices or be connected wirelessly, if desired.

The module 10 preferably is designed as a self-contained readily replaceable unit to assist in initial mounting and subsequent repair by merely replacing the module 10. In this respect, the module 10 can be used substantially as an interchangeable platform for use with multiple vehicles or other objects as is more frequently being requested in military or other operations to reduce costs incurred from the use of multiple platforms.

Additionally, a minimal amount of electronics may be included with the cameras 20 or within the housing 20 for wireless communication with a variety of external peripheral devices. Such devices may include, for example, remote displays, microprocessor controlled devices, various user input/output devices or the like. External viewing can be a composite view of all of the cameras 20, the view of any individual camera 20 or any combination of two or more video cameras 20 if desired.

In one preferred embodiment, the view provided by the cameras 20 may be fed to an operator or other individual or individuals at a location proximate to or remote from the module(s) 10. This view can, for example, be used to manipulate the robot 24 or transport vehicle 26 about various terrain and environments or to accomplish various tasks. It is to be understood that to manipulate the robot 24 or transport vehicle 26 discrete electronic and power systems separate from the electronics of the module 10 may be employed.

Additionally, the head mounted display 28 of FIG. 4 may be used by a wearer to provide a full view about the viewer to both the viewer as well as one or more individuals at remote locations. Although the head mounted display 28 is illustrated with four modules 10 positioned on the front, rear and two sides respectively, it is to be understood that the number and position of the modules 10 can vary.

One of the many important features of the module 10 is the ability to simultaneously capture and display all data with regard to all views of each camera 20 in real time or substantially real time. This enables viewers at remote locations to choose one or more cameras 20 to select the view or composite view they are interested in viewing regardless of the direction the wearer is facing. This may enable the remote viewers to draw the attention of the wearer to another direction that may be of interest to them or to watch one or more directions for the safety of the wearer, such as in a military, police or similar applications.

Additionally, since various camera views from multiple cameras 20 are simultaneously captured or "pre-loaded", delays in changing views with the head mounted display 28 upon turning of the wearer's head or turning of the robot 24 or transport vehicle 26 is reduced or eliminated. When using a single camera rather than multiple cameras 20 as in the present invention there will be a lag or delay in views when the camera is moved which is undesirable and perhaps dangerous in certain applications.

Similarly, when multiple modules 10 are utilized providing various views from multiple cameras 20 from each module 10, the various camera views from multiple cameras 20 are simultaneously captured or "pre-loaded" to eliminate delays in views. This is an important feature for not only the head mounted display 28 but also the robot 24 and transport vehicle 26.

For example, with a head mounted display 28 if only one module 10 is used the views provided by the multiple cameras 20 is more of a panoramic or "panospheric" view that extends in a hemispherical direction substantially in the direction the module is facing. As the wearer turns his/her head say to the left, the view that previously was on the left periphery of the wearer now becomes the front view with respect to the wearer. At the same time, a new left periphery view is provided to the wearer or remote viewer.

When using multiple modules 10, the wearer is always provided with a clear view of the direction he/she is facing. It also enables a wearer to more quickly move his/her head back and forth without losing the view of the direction he/she is facing.

Another important feature of the module 10 is the ability to enable more placement positions with respect to an object, such as the robot 24 or transport vehicle 26. This is not only due to the substantially small size of the module 10 but due to the use of multiple modules 10 that break up the 360 degree view into several hemispherical views that may overlap each other to provide redundant or overlapping views. Typically, in existing applications if single or multiple cameras are provided in a central location (not illustrated) for fixed position or rotation to provide a wide view up to 360 degrees, that view readily can be blocked during operation of the robot 24 or transport vehicle 26 by components of the robot 24 or transport vehicle 26.

The relatively small sizes capable of the module 10 enable more placement positions on an object to provide increased number of views or placement where a camera system typically may not fit. Additionally, due to the small size of the module 10 it can be placed closer to an object or surface to reduce the size of any potential blind spot that may occur near the object or surface itself.

When multiple modules 10 are used with a robot 24 or other unmanned transport vehicle 26 since the robot 24 or vehicle 26 can typically move in multiple directions, when one module 10 is broken or disabled the robot 24 or vehicle 26 can still function. In this situation, an operator can merely switch views to another module or modules 10 and merely direct the robot 24 or vehicle 26 to move in another direction while the operator can still manipulate the robot 24 or vehicle 26 as desired.

As discussed above, providing a plurality of modules 10 each with multiple miniature inexpensive cameras 20 in a particular application represents a complete divergence from the current state of camera modules where single, large, expensive modules typically are employed. Such single modules can interfere with other objects, can readily be spotted and disabled and provide no redundancy in the event of failure or obstructions, among other drawbacks.

Figure 6:
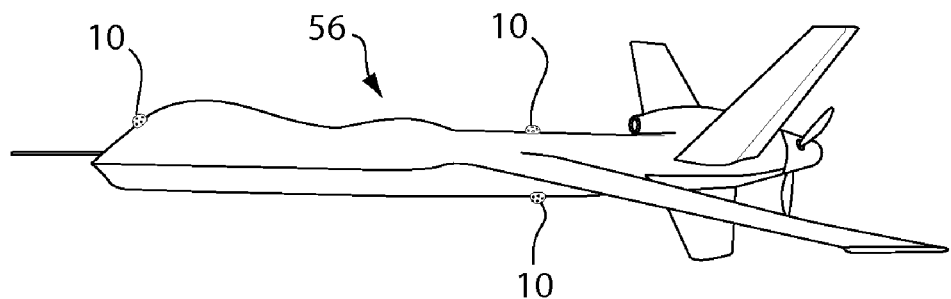
FIG. 6 is a perspective view illustrating multiple camera modules of FIG. 1 utilized with an aerial vehicle such as an unmanned aerial vehicle or drone.

These drawbacks are unacceptable for many applications of cameras which has severely limited their application in many areas that could benefit from their use, such as military, robotics and surveillance among other areas. For example, FIG. 6 illustrates one potential military application where an unmanned aerial vehicle or UAV 56 can be fitted with any number of modules 10 of the present invention.

As can readily be appreciated, the modules 10 do not interfere with any of the other mechanisms of the UAV 56 such as the propulsion mechanisms, ordinance, payloads or even aerodynamics. Typical existing modules tend to be single modules mounted on a pedestal or the like and the views cannot be obstructed or a remote operator cannot see all angles and accurately control the UAV 54 as necessary. This not only is a major concern with existing modules for applications to UAVs but for any application such as a robot or other vehicle such as a car, truck or the like.

Additionally, it has become increasingly popular to provide full 360 degree panoramic views for use in movies, simulators, attractions such as amusement parks or the like, video games, internet cites, cell phones and GPS units or any other type of application. In these applications it typically is desirable to provide actual footage of an existing environment such as a neighborhood, city, golf course, race track, flight path or any other similar application.

For example, flight training for pilots typically is accomplished in a flight simulator (not illustrated). During such training, in order to provide the trainee with the most realistic training possible, the trainee can be situated in an environment surrounded by multiple screens each screen representing the views that may be encountered in actual use by looking out windows, monitoring video cameras or the like.

Typically these multiple views are computer generated as opposed to providing actual footage of real life flying conditions such as terrain, cloud cover, other aircraft and the like. Providing those views as actual footage clearly is an advantage which can readily be provided in an economical manner with the modules 10 of the present invention.

Similarly, popular attractions at amusement parks provide a 360 degree virtual reality exhibit taking customers across various parts of the earth. Use of the modules 10 of the present invention can help provide such views in an economical manner as well as enable stitching of the best possible views among redundant views for the best enjoyment of the customers.

In various internet, gaming, GPS and cell phone applications, for example, views of actual locations on earth are increasingly popular. Such applications typically are provided by driving or walking around neighborhoods or other locations to capture desired views with one or more cameras. Existing systems with one or more cameras typically are readily blocked by various equipment or other items such as other people, cars and similar impediments thereby preventing the unobstructed views needed.

With the modules 10 of the present invention, multiple views of the same scene can readily be captured in a cost effective manner. This not only contributes to more applications being developed, but enables more versatility in the views being selected for the benefit of the end user and eliminating unobstructed views in many if not all applications. Thus, a user can traverse a desired location once and rely on capturing the desired footage thereby reducing the chance of having to retake the footage again in the future due to obstructions or failure of one or more modules or cameras.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for example, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A method of providing an omnidirectional view about an object, comprising:
   providing at least two camera modules, each module having a plurality of cameras disposed about the periphery of each module with each camera having a predetermined field of view;
   directly attaching each module to a respective predetermined position on a surface of the object to provide up to a 360 degree view about the object when the fields of view of each camera are combined from each module; and
   enabling electrical communication between the plurality of cameras and at least one position external to the module to enable viewing about the object from the external position.

2. The method as defined in claim 1, wherein the electrical communication is a wireless type of electrical communication.

3. The method as defined in claim 1, wherein the object is at least one of a robot or other type of unmanned vehicle or craft.

4. The method as defined in claim 1, wherein the external position is external to both the module and the object.

5. The method as defined in claim 1, wherein the views provided by each camera may be combined to provide a segmented view about the object.

6. The method as defined in claim 1, wherein the 360 degree view is a combination of at least two substantially hemispherical views.

7. The method as defined in claim 1, wherein each module is provided substantially in the form of a hemisphere and the flat portion of the hemisphere is attached to the object.

8. The method as defined in claim 1, wherein viewing about the object can take place in more than one external position.

9. The method as defined in claim 1, wherein each module has a low profile and a flat surface for directly attaching to the surface of the object.

10. The method as defined in claim 1, wherein the modules are positioned so that they do not interfere with any movement or operation that may be performed by the object.

11. The method as defined in claim 10, wherein the object is at least one of a robot or other unmanned vehicle having at least one mode of operation that may block at least a portion of at least one camera.

12. The method as defined in claim 1, wherein the modules may be used to provide views that enable the object to be moved or manipulated.

13. The method as defined in claim 12, wherein when one module is inoperable, blocked or otherwise can not provide one or more camera views the object can still be moved or manipulated by use of the at least one other module or camera.

14. The method as defined in claim 1, wherein each module is a completely self-contained module.

15. A method of providing a real-time composite video image of an area, comprising:

providing a platform;

attaching at least two modules to predetermined portions of the platform, each module having a plurality of video cameras disposed about the periphery of each module with each camera having a predetermined field of view;

capturing video streams from each camera;

moving the platform as desired;

transmitting the video streams to a location remote from the platform; and stitching at least two of the camera views together to provide a composite image as the platform moves.

16. The method as defined in claim 15, wherein stitching is provided prior to the images being transmitted from the platform.

17. The method as defined in claim 15, wherein the platform is at least one of a ground vehicle, manned aerial vehicle or an unmanned aerial vehicle.

18. The method as defined in claim 15, including selecting at a remote location the individual or composite view desired.

19. The method as defined in claim 15, wherein the video streams can be transmitted to more than one remote location.

* * * * *